United States Patent
Gaillard et al.

(10) Patent No.: US 9,822,909 B2
(45) Date of Patent: Nov. 21, 2017

(54) RING FOR FASTENING A PIPE TO A TUBULAR BODY AND CONNECTION MEANS COMPRISING SUCH A RING

(71) Applicant: PARKER HANNIFIN MANUFACTURING FRANCE SAS, Annemasse (FR)

(72) Inventors: Alain Gaillard, Bruz (FR); Jean-Noel Musellec, Chartres de Bretagne (FR); Yoann Averty, Blain (FR); David Fouche, Maure de Bretagne (FR); Cyril Leroyer, Montgermont (FR)

(73) Assignee: PARKER HANNIFIN MANUFACTURING FRANCE SAS, Annemasse (FR)

( * ) Notice: Subject to any disclaimer, the term of this patent is extended or adjusted under 35 U.S.C. 154(b) by 0 days.

(21) Appl. No.: 15/116,701

(22) PCT Filed: Jan. 28, 2015

(86) PCT No.: PCT/EP2015/051736
§ 371 (c)(1),
(2) Date: Aug. 4, 2016

(87) PCT Pub. No.: WO2015/117874
PCT Pub. Date: Aug. 13, 2015

(65) Prior Publication Data
US 2016/0348813 A1    Dec. 1, 2016

(30) Foreign Application Priority Data

Feb. 6, 2014   (FR) .................................... 14 50929

(51) Int. Cl.
*F16L 19/03*   (2006.01)
*F16L 19/02*   (2006.01)

(52) U.S. Cl.
CPC ....... *F16L 19/0206* (2013.01); *F16L 19/0231* (2013.01)

(58) Field of Classification Search
CPC ... F16L 19/0206; F16L 19/02; F16L 19/0212; F16L 19/0231; Y10T 24/44026;
(Continued)

(56) References Cited

U.S. PATENT DOCUMENTS 2,675,256 A  *  4/1954  Cornell ................. E04H 12/182
                                                      248/188.5
4,127,289 A     11/1978  Daspit
(Continued)

FOREIGN PATENT DOCUMENTS

EP        1 085 245 A1      3/2001
JP       2001124257 A  *    5/2001   .......... F16L 19/0231
WO         98/30825 A1      7/1998

OTHER PUBLICATIONS

International Search Report for corresponding Patent Application No. PCT/EP2015/051736 dated Mar. 10, 2015.

*Primary Examiner* — Robert J Sandy
*Assistant Examiner* — Michael Lee
(74) *Attorney, Agent, or Firm* — Renner, Otto, Boisselle & Sklar, LLP

(57) ABSTRACT

The invention concerns a ring (4) for fastening a pipe (1) to a tubular body (2). According to the invention, the ring comprises two rigid sectors (5) that are coupled to each other by at least one elastically deformable annular portion (12), the two sectors and the portion being a single part, each sector (5) having an inner face (6), protruding from which at least one anchoring stud (7) extends radially, intended to be received in a housing correspondingly provided in a wall of the pipe, each anchoring stud (7) comprising two grooves (9) extending circumferentially to either side of said anchoring
(Continued)

stud. The invention also concerns connection means comprising such a ring.

13 Claims, 2 Drawing Sheets

(58) Field of Classification Search
CPC ..... Y10T 403/32467; Y10T 403/32475; Y10T 403/32491; Y10T 403/7077
See application file for complete search history.

(56) References Cited

U.S. PATENT DOCUMENTS

| | | | | |
|---|---|---|---|---|
| 5,481,949 | A * | 1/1996 | Yen | B25B 23/0035 279/24 |
| 6,305,054 | B1 | 10/2001 | Imes et al. | |
| 6,508,493 | B1 * | 1/2003 | Guivarc'h | F16L 19/0231 285/354 |
| 6,874,970 | B2 * | 4/2005 | Byrd | F16L 33/2076 403/192 |
| 2005/0110270 | A1 * | 5/2005 | Huang | F16L 19/0206 285/31 |
| 2006/0101600 | A1 * | 5/2006 | Weaver | A47L 13/24 15/145 |
| 2008/0061551 | A1 * | 3/2008 | Simmons | F16L 19/02 285/249 |

* cited by examiner

RING FOR FASTENING A PIPE TO A TUBULAR BODY AND CONNECTION MEANS COMPRISING SUCH A RING

The invention relates to a ring for fastening a pipe to a tubular body. The invention also relates to means for connecting a pipe to a tubular body comprising such a fastener ring.

TECHNOLOGICAL BACKGROUND OF THE INVENTION

In order to enable two pipes to be coupled together, it is known to use a tubular body having a first end arranged to receive an end of one of the pipes and a second end arranged to receive an end of the other pipe.

In order to lock the ends of the pipes in the corresponding ends of the tubular body and to seal said couplings, connection means are known that comprise a sleeve subdivided into first and second portions in axial succession provided with means for connecting said portions in leakproof and releasable manner respectively to the end of the tubular body and to the pipe. The connection means further comprise a fastener ring that is shaped so as to be locked axially on the pipe set back from its end. The fastener ring makes it possible to constitute an abutment shoulder when the pipe is engaged in the tubular body and an axial abutment shoulder between the second portion of the sleeve and the pipe.

Document EP-A-1 085 245 in the name of the Applicant describes such connection means and in particular a fastener ring in the form of two half-rings that are secured together by an elastic band.

OBJECT OF THE INVENTION

An object of the invention is to provide a fastener ring that proves to be simple to mount on a pipe for coupling to a tubular body and connection means comprising such a ring.

BRIEF DESCRIPTION OF THE INVENTION

In order to achieve this object, there is provided a ring for fastening a pipe to a tubular body.

According to the invention, the ring comprises two rigid sectors that are hinged to each other via at least one elastically deformable annular portion, both sectors and the portion being made as a single part, each sector having an inside face from which there projects radially at least one anchor pad that is designed to be received in a housing formed in corresponding manner in a wall of the pipe, each anchor pad including two grooves extending circumferentially on either side of said anchor pad.

Thus, the ring of the invention is made as a single piece, which facilitates mounting on a pipe. An operator need only deform the annular portion in order to move the two rigid sectors apart from each other sufficiently to engage the ring laterally on the pipe. The operator may possibly need use only one hand to arrange the ring on said pipe.

Furthermore, the co-operation of the pads with the corresponding housings makes it possible to ensure axial locking of the ring on the pipe, the grooves making it possible to provide better anchoring of the pads in the housings. Under the pressure of the fluid flowing in the pipe, the wall of the pipe penetrates into the grooves of the pads thus locking the pads in the housings.

The invention also provides means for connecting a pipe to a tubular body having an end arranged to receive an end of the pipe. The connection means comprise a sleeve subdivided into first and second portions in axial succession provided with means for connecting said portions in leakproof and releasable manner respectively to the end of the tubular body and to the pipe, and a ring of the abovementioned type.

BRIEF DESCRIPTION OF THE DRAWINGS

The invention can be better understood in the light of the following description of a particular non-limiting embodiment of the invention.

Reference is made to the accompanying figures, in which.

DETAILED DESCRIPTION OF THE INVENTION

The invention as described below is suitable for taking part in connecting a pipe 1 to a tubular body 2.

Figure 1:
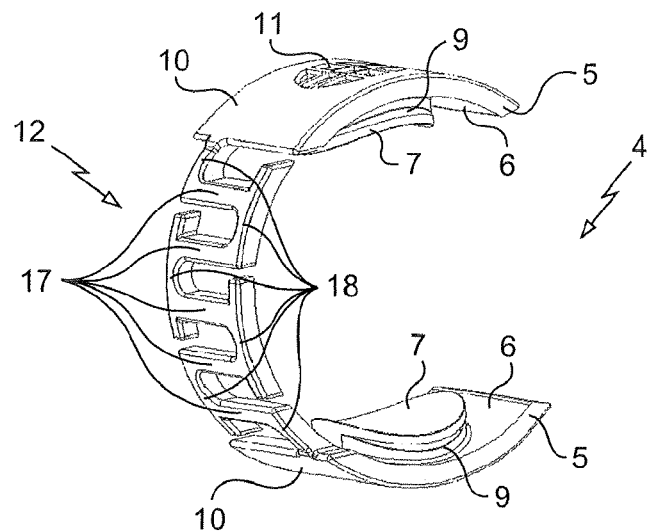
FIG. 1 is a perspective view of the fastener ring of the invention.
Figure 2:
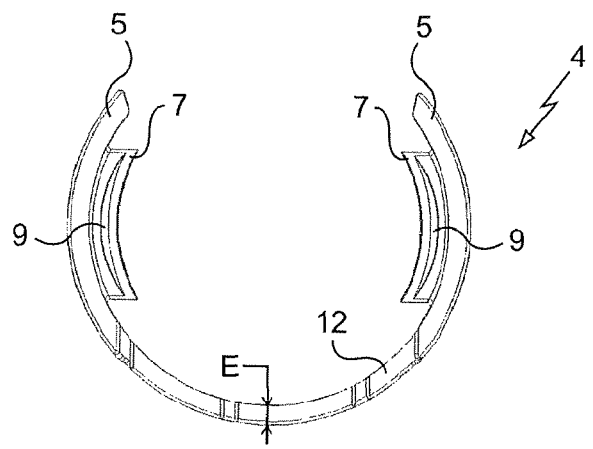
FIG. 2 is a side view of the ring shown in FIG. 1.
Figure 3:
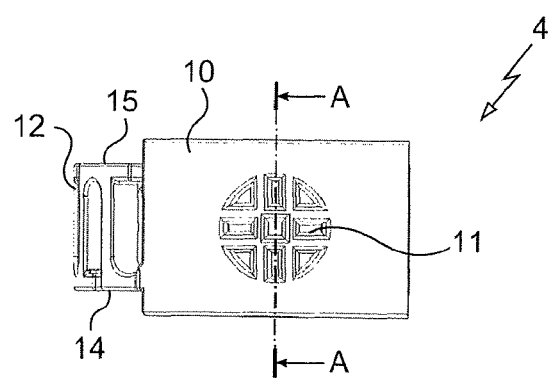
FIG. 3 is a plan view of the ring shown in FIG. 1.
Figure 5:
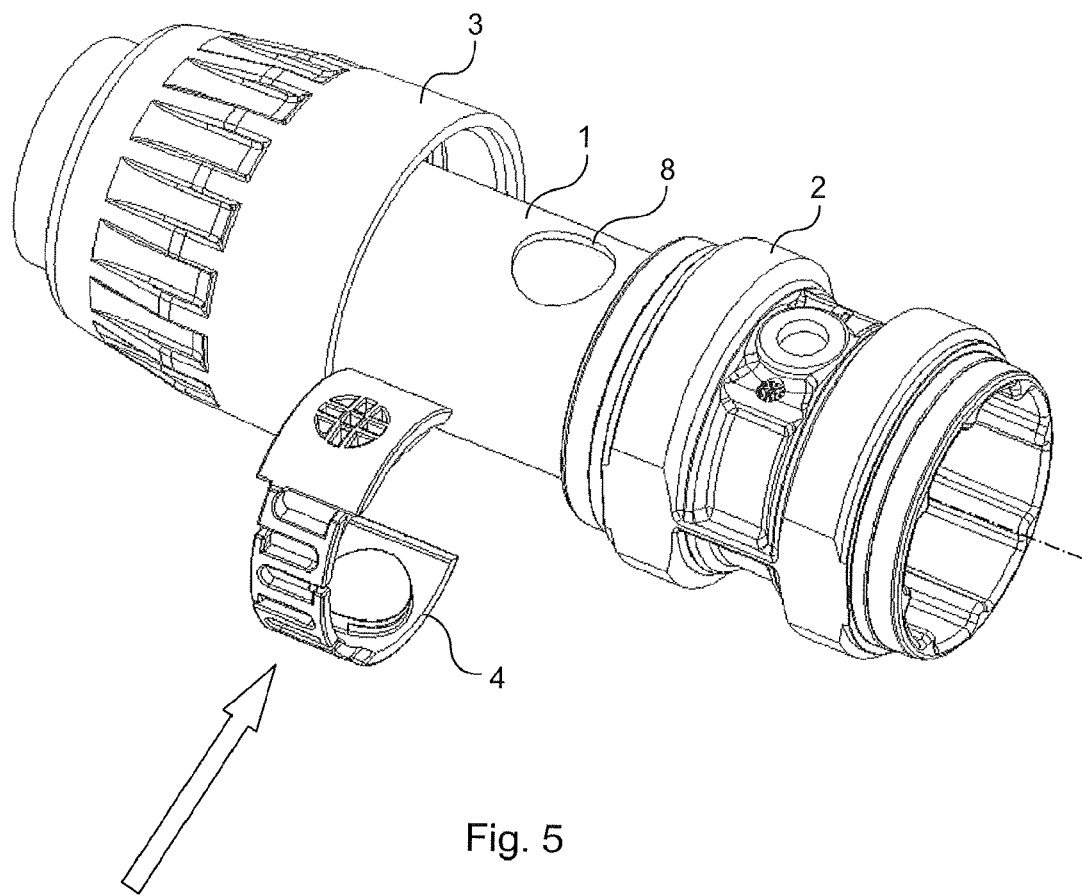
FIG. 5 is a perspective view of the ring shown in FIG. 1 before being mounted on a pipe received at one end in a tubular body.

With reference to FIG. 5, means for connecting the pipe 1 to the tubular body 2 in this embodiment include a sleeve 3 subdivided into first and second portions in axial succession provided with means for connecting said portions, in leakproof and releasable manner, respectively to the end of the tubular body 2 and to the end of the pipe 1. Since such a sleeve 3 is well-known in the prior art, it is not described in greater detail herein.

The connection means also comprise a fastener ring of the invention, generally given reference 4, which, in this embodiment, makes it possible to constitute an abutment shoulder when the pipe 1 is engaged in the tubular body 2 and an axial abutment shoulder between the second portion of the sleeve 3 and the pipe 1.

Thus, in order to couple the pipe 1 to the tubular body 3, an operator mounts the sleeve 3 on an end of the pipe 1 and installs the ring 4 on the pipe.

Then, the operator inserts said end in the end of the tubular body 2. The operator then screws the sleeve 3 onto the tubular body 2, the sleeve 3 thus coming to cooperate with said ring 4 in order to provide complete coupling of the tubular body 3 to the pipe 1.

The tubular body 3 is then coupled to its other end to another pipe or to a functional member, such as a valve or a filter (not shown in this embodiment).

The fastener ring 4 of the invention is described below.

With reference to FIGS. 1 to 4, the ring 4 comprises two rigid sectors 5 having a circularly-arcuate profile so as to fit closely around the outside surface of the pipe.

In this embodiment, the two sectors 5 are identical to each other.

Figures 4, 6:
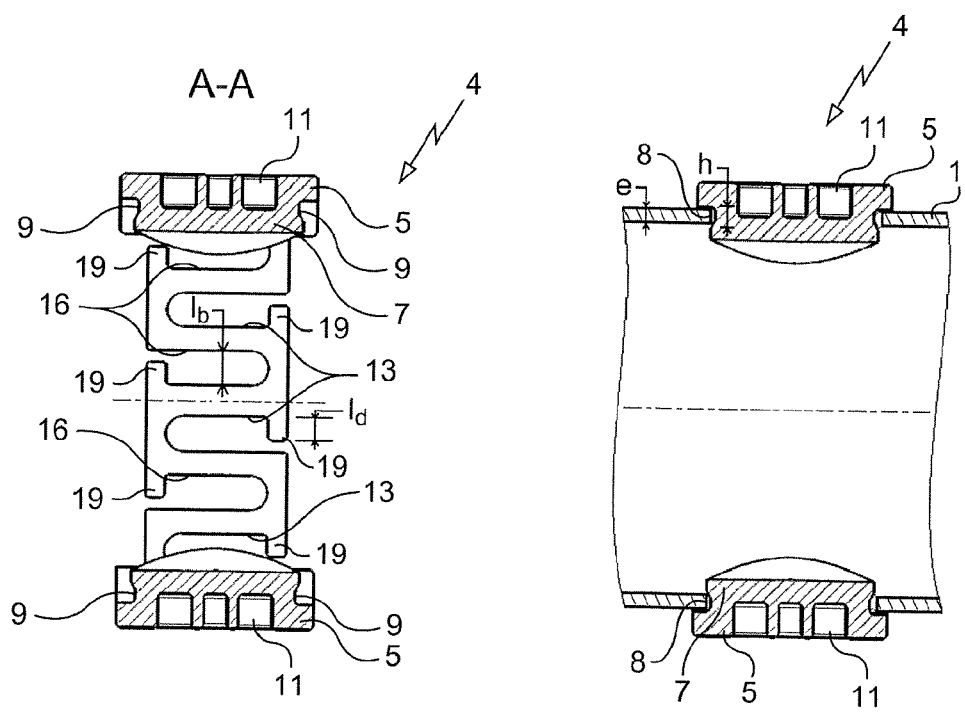
FIG. 4 is a section view of the ring shown in FIG. 1.
FIG. 6 is a section view of the ring mounted on the pipe of FIG. 5.

In the invention, each sector 5 has an inside face 6 from which at least one anchor pad 7 projects radially, the pad being designed to be received in a housing 8 formed in corresponding manner in a wall of the pipe 1 (as shown more clearly in FIGS. 5 and 6).

The co-operation of the pads 7 with the corresponding housings 8 makes it possible to ensure axial locking of the ring 4 on the pipe 1, in this embodiment set back from the end of said pipe 1.

In the invention, each anchor pad 7 includes two grooves 9 extending circumferentially on either side of the anchor pad 7.

In this example, each pad 7 has a height (height defined along an axial direction of the anchor pad 7 under consideration) greater than the thickness e of the wall of the pipe 1 (thickness defined along a radial direction of the pipe) and each groove 9 has a width h (width defined along an axial direction of the anchor pad 7 under consideration and along a transverse direction of the groove measured between the edges thereof) that is at least equivalent to the thickness e of said wall.

The grooves 9 make it possible to ensure better anchoring of the pads 7 in the housings 8. Under the pressure of the fluid flowing in the pipe 1, the wall of the pipe 1 penetrates into the grooves 9 of the pads 7 thus locking the pads 7 in the housings 8. It is understood that the groove 9 may have sides that are parallel or that preferably converge towards the base of the groove (in this configuration, the wall of the pipe need only penetrate in part into the groove).

In a particular embodiment, opposite from its inside face 6, each sector 5 has an outside face 10 that includes a partly-recessed zone 11.

By way of example, the partly-recessed zone 11 makes it possible to avoid shrinkage during manufacturing of the ring 4 by molding.

Preferably, each zone 11 is arranged on the outside face 10 of the sector 5 considered substantially at the same level as the anchor pad 7 on the inside face 6 of said sector 5. The zone 11 is thus arranged opposite the anchor pad 7 of the corresponding sector 5.

This limits even further the occurrence of shrinkage during manufacturing of the ring 4.

In this embodiment, the two sectors 5 are hinged to each other via a single elastically deformable portion 12, both sectors 5 and the portion 12 being made as a single part. The portion 12 thus has a circularly-arcuate profile so as to fit closely around the outside surface of the pipe. The sectors 5 thus form respective free ends of the ring 4, which is therefore open (the ring 4 thus being C-shaped).

Mounting the ring 4 on the pipe is found to be particularly simple since it can be done using only one hand, the operator needing only to move the two sectors 5 apart from each other in order to mount the ring 4 on the pipe 1. This makes it possible for the operator to hold the pipe in the other hand, or to hold onto a ladder for pipes that are in a high-up location, for example.

The sectors 5 and the portion 12 are shaped in such a manner that the ring 4 forms a circular arc of more than 180 degrees when the ring 4 is in the rest position, i.e. when the portion 12 is not deformed.

This limits the risk of the ring 4 accidentally becoming separated from the pipe.

In this embodiment, the sectors 5 and the portion 12 are shaped in such a manner that the two anchor pads 7 face each other and are centered relative to each other when the ring 4 is in the rest position. As a result, the anchor pads 7 are diametrally opposite when the ring 4 is installed on the pipe, providing the housings 8 are also diametrally opposite.

The portion 12 is preferably shaped so as to be elastically deformable axially and circumferentially.

Thus, if the two housings 8 of the pipe 1 are not accurately opposite and centered relative to each other, it nevertheless remains possible to fasten the ring 4 correctly to the pipe 1. The portion 12 may thus remain slightly deformed when the ring 4 is arranged on the pipe 1 in order to compensate for the poor alignment of the two housings 8.

In a preferred embodiment, the portion 12 includes first slots 13 extending axially from a first side wall 14 of the portion 12 towards the second side wall 15, and second slots 16 extending axially from the second side wall 15 towards the first side wall 14.

The portion 12 is therefore of sinuous shape, which ensures it will be able to be deformed elastically. It is thus possible to deform the portion 12 by lengthening it, by shortening it, and also by inclining it in order to compensate for the poor alignment of the housings.

The sinuous portion is made up of branches 17 that extend axially and of edges 18 that extend circumferentially, two consecutive branches 17 being connected together by an edge 18, and two consecutive edges 18 being connected together by a branch 17.

Preferably, the portion 12 includes fingers 19, each slot being associated with one of said fingers 19 in such a manner that each finger 19 extends circumferentially through the associated slot in order to close said slot in part.

In this embodiment, each finger 19 extends in such a manner as to close the open end of the associated slot in part, i.e. each finger extends circumferentially in line with one of the edges 18 of the sinuous portion and projects into the opening of the slot.

In this embodiment, each finger 19 has a length $l_d$ (dimension measured along a circumferential direction of the portion 12) that is less than a width $l_b$ (also defined along a circumferential direction of the portion 12) of the slot extending between two adjacent branches of the sinuous portion in such a manner that the passage left free by the finger 19 is smaller than the thickness E of the ring (measurement not including anchor pads 7).

In this way, when handling a plurality of rings 4 of the invention, the fingers 19 prevent the slots from being inserted in one another, thereby limiting the risk of the portions 12 of the various rings 4 getting tangled.

Preferably, the ring 4 is made entirely of plastics material, e.g. of plastics material filled with glass fibers.

Since sectors 5 and the portion 12 are made integrally, the ring 4 is very simple to manufacture, e.g. by molding.

Naturally, the invention is not limited to the embodiment described and variants can be applied thereto without going beyond the ambit of the invention as defined by the claims.

In particular, although the two rigid sectors in this embodiment are hinged to each other by a single elastically deformable annular portion, both sectors could be hinged to each other by a number of different elastically deformable annular portions. By way of example, the ring could comprise two elastically deformable annular portions, each hinging the two rigid sectors together in such a manner that the ring forms a closed circle.

The ring could include additional means in addition to the anchor pads in order to lock it axially on the pipe in removable manner, such as retractable pads.

Although in this embodiment, the portion is elastically deformable in all directions, the portion could be shaped so as to be deformable in the circumferential direction only (i.e. to be capable of being lengthened and/or shortened only) or to be elastically deformable in the axial direction only (i.e. to be inclinable only).

The invention claimed is:

1. A ring for fastening a pipe to a tubular body, the ring comprises two rigid sectors that are hinged to each other via at least one elastically deformable annular portion, both sectors and the portion being made as a single part, each sector having an inside face from which there projects radially at least one anchor pad that is designed to be received in a housing formed in corresponding manner in a wall of the pipe, each anchor pad including two grooves extending circumferentially on either side of said anchor pad.

2. The ring according to claim 1, wherein each anchor pad is of height that is greater than a thickness of a wall of the pipe and each groove is of width that is at least equivalent to the thickness of said wall of the pipe in order to enable the wall to engage in the groove at least in part.

3. The ring according to claim 1, having a single portion for connecting together the sectors, the sectors forming respective free ends of the ring.

4. The ring according to claim 1, wherein the sectors and the portion are shaped in such a manner that the ring is open and forms a circular arc of more than 180 degrees when the ring is in the rest position.

5. The ring according to claim 1, wherein the portion is shaped in such a manner as to be elastically deformable axially and circumferentially.

6. The ring according to claim 1, wherein the portion includes first slots extending axially from a first side wall of the portion towards a second side wall of the portion, opposite the first side wall, and second slots extending axially from the second side wall towards the first side wall in such a manner that the portion is of sinuous shape.

7. The ring according to claim 6, wherein the portion includes fingers, each slot being associated with one of said fingers in such a manner that each finger extends circumferentially through the associated slot in order to close said slot in part.

8. The ring according to claim 7, wherein each finger extends in such a manner as to close in part an open end of the associated slot.

9. The ring according to claim 1, wherein, opposite from its inside face, an outside face of each sector includes a partly-recessed zone.

10. The ring according to claim 9, wherein each partly-recessed zone is arranged on the outside face of the sector considered substantially at the same level as the anchor pad on the inside face of said sector.

11. The ring according to claim 1, wherein the ring is made of plastics material.

12. The ring according to claim 11, wherein the ring is made of plastics material filled with glass fibers.

13. A means for connecting a pipe to a tubular body having an end arranged to receive an end of the pipe, the connection means comprising a sleeve subdivided into first and second portions in axial succession provided with means for connecting said portions in leakproof and releasable manner respectively to the end of the tubular body and to the pipe, the connection means including a ring according to claim 1.

\* \* \* \* \*